United States Patent Office 2,744,827
Patented May 8, 1956

2,744,827

MANUFACTURE AND PRESERVATION OF CHEESE

Alexander T. R. Mattick and Andrei Hirsch, Shinfield, near Reading, England, assignors to National Research Development Corporation, London, England No Drawing. Application March 3, 1952,
Serial No. 274,656

Claims priority, application Great Britain March 7, 1951

8 Claims. (Cl. 99—162)

This invention relates to the manufacture or preservation of cheese of kinds liable to become blown or distended due to the growth of spoilage organisms or anaerobic sporeformers (bacteria known as clostridia). The type of cheese concerned includes Gruyère, Compté, Beaufort, Emmenthal, Brie, Danish-Swiss, Swedish Manor House, and similar types in which acidity developed by the bacteriological cultures known as starters is not allowed to become high enough to inhibit the growth of the spoilage organisms. The invention is also applicable to processed cheese which is also liable to be spoiled by the growth of anaerobic sporeformers.

We have now ascertained that it is possible to add to the cheese milk a starter which will inhibit the growth of clostridia without adverse action to the cheese manufacture. We have further discovered that cheese can be treated to inhibit the growth of clostridia.

According to the invention an antibiotic-producing bacterial culture is added to the cheese or to the cheese milk.

Thus there may be incorporated in the milk a starter consisting of or including an antibiotic-producing bacterial culture. This culture may be added at the same time as the normal starter and the cheese manufacturing process may be otherwise carried out in normal manner. Usually a starter is included at the rate of 0.5 to 2% by volume of the cheese milk. When an antibiotic-producing starter is used in addition to the normal starter, the concentration of the latter may be 0.5% and 0.5% antibiotic starter also added to the cheese milk, so that the final concentration of starter in the cheese milk is about the same as normally used.

The antibiotic-producing culture may be isolated in the following manner. Milk is left to sour at 30° C. and then plated out. Single colonies of bacteria are picked and incubated in sterile milk medium at 30° C. These pure cultures are tested to antibiotic (nisin) production by the rapid assay technique described in Journal of General Microbiology, volume 4, page 70 (A. Hirsch). When (possibly after many tests) an antibiotic culture is isolated a young culture in milk can be used for the present invention as described above. "Nisin" is the antibiotic used for the present invention and is a polypeptide produced by Streptococcus lactis strains of lactic streptococci.

For use as a starter the antibiotic culture can be used alone for some cheeses (e. g. some French cheeses) but generally will be used in addition to a normal starter.

The following experiments demonstrate the application of the invention as applied to cheese made from cheese milk treated with an antibiotic culture.

From six nisin-producing strains of streptococci found to inhibit clostridia and lacto-bacilli but not thermophilic streptococci and propionic acid bacteria, the strain No. 12 was selected for further work because it grew well in milk in which it produced appreciable quantities of nisin. The clostridium strain selected (C16) was a vigorous gas producer, isolated from a "blown" cheese.

In laboratory experiments simulating the preparation of Swiss cheese, No. 12 was found to survive the necessary heating and subsequently inhibited gas production by C16, whereas a non-inhibitory lactic streptococcus had no such effect.

Twenty-one experimental cheese, each weighing 15 lb., were then made by two different methods. In the first, the development of acidity was controlled by heating the curd to 55° C. (high scald), and in the second by washing the curd with hot water to raise the temperature of the vat to 42° C. (washed curd). The nisin content of some of the cheese was followed by dilution assays. Nisin was never detected in control cheese made without No. 12, neither was it found during the making nor in the whey. The high scald cheese never contained appreciable quantities of nisin, but the washed curd cheese when 2–4 days old contained nisin up to 375 units/g. There was subsequently a rapid decrease in the nisin concentration.

Milk heavily infected with spores of C16 was used in ten of the experimental cheese (Table 1). The milk for half the cheese was inoculated with a Swiss cheese starter containing thermophilic streptococci, lactobacilli and propionic acid bacteria. The other half received in addition an inoculum of No. 12. Seventeen to twenty-two days later all the cheese made without No. 12 was distended by gas, but all the No. 12 cheese were normal. It therefore appears that gas production by anaerobes in Swiss-type cheese can be controlled by using a nisin-producing strain of Str. lactis with the starter, without impairment of the necessary propionic acid fermentation.

Table 1.—The inhibition of a strain of clostridium infecting some Swiss-type cheese by an antibiotic producing streptococcus.

| Cheese No. | Starter used [1] | Method of cheese-making [2] | Time of blowing (days after making) |
|---|---|---|---|
| 8 | Normal | WC | 22 |
| 9 | Normal+No. 12 | WC | ---------- |
| 12 | Normal | HS | 18 |
| 13 | Normal+No. 12 | HS | ---------- |
| 16 | Normal | WC | 17 |
| 17 | Normal+No. 12 | WC | ---------- |
| 18 | Normal | WC | 18 |
| 19 | Normal+No. 12 | WC | ---------- |
| 20 | Normal | WC | 19 |
| 21 | Normal+No. 12 | WC | ---------- |

[1] Normal starter a mixture of thermophilic streptococci, lactobacilli and propionic acid bacteria. Strain No. 12 was the antibiotic producing streptococcus.
[2] WC=washed curd method; HS=high scald method.

In the application of the invention to the manufacture or preservation of processed cheese the cheese may, in the usual way, be heated and mixed with stabilising salts which impart a smooth texture to the cheese, and an emulsifier in water or whey then being added to ensure softness and spreadability. The anaerobic sporeformers and also aerobic sporeformers are susceptible to destruction by the antibiotic nisin. If milk containing nisin-producing organisms is soured the whey contains the nisin. This whey is then incorporated into the processed cheese.

The following tests concerning the application of the invention to processed cheese are referred to by way of example.

The tests were conducted in a small steam-heated kneader permitting of treating, during each melting operation, about 4 kg. of previously grated and well mixed Gruyère cheese.

The contamination of the cheese by clostridia was effected by one of the following methods:

(a) The addition of a culture of clostridia to the cheese immediately before the melting, producing a mass infection thereby: the C12 strain described in "Journal of Dairy Research" 1951, 18, 205 and two other strains isolated from swelled melted cheese (3P, 4 L$gc$).

(b) In one of the tests, the C16 strain of clostridia was inoculated in a heavy dose into the evaporator milk intended for the manufacture of the cheese and the latter was melted after ripening without receiving any other addition of clostridia culture.

(c) Finally, there was also employed cheeses which were not artificially inoculated, but the appearance of which revealed characteristics likely to favour the subsequent swelling of the melted cheese.

The various tests included the preparation of the following mixings:

(a) The mixings serving for the controls received the quantities of water and of salts (sodium citrate and citric acid or polyphosphates) necessary for bringing the content of dry substance and the pH of the paste to predetermined values.

(b) In another series of mixings, the addition of water was replaced by the addition of a culture on milk of the strain *Streptococcus lactis* No. 12, which is a producer of nisin. The quantity of culture added, and the proportion of melting salts were such as to maintain in the final product a content of dry substance and a pH as near as possible to those in the control mixings.

(c) Also there were prepared mixings in which the culture of No. 12 strain was replaced either by pasteurised milk or by a culture on milk of *Streptococcus cremoris* IP5 which does not produce nisin and serves as a test organism for the dosage of this substance. The object was to test in this manner the influence which might be exerted by an addition of milk on the development of clostridia in the melted cheese.

(d) Finally, in some tests were added, instead of the inhibiting culture, a nisin solution so as to obtain in the melted cheese, without introduction of milk, nisin concentrations similar to those given by the culture of No. 12 strain.

After the melting, the still liquid cheese was immediately distributed in tins (shallow 1/10 boxes of 90 g.) and in Petri boxes which were filled as completely as possible. They were all placed in an oven at 37° C.

Comparative tests at different temperatures showed us that between 30° and 37° C. the proportion of tins swollen at the end of one month did not vary substantially. At 45° C., on the other hand, the swelling took place much more slowly. 37° C. was adopted as a datum temperature for the preservation test.

The examinations were made each day throughout the period of incubation. Bulging of the tins was noted and in the Petri tins white stains were observed frequently with a black centre, constituting the centres of development of the clostridia. The partial liquefaction of the cheese (resulting from the proteolyses) was also visible to the eye in the case of the Petri tins, or was observed on simple shaking, which made perceptible to the ear the presence of liquid in the tins.

It was observed during the work that in order to make valid comparisons between a number of tests, it was preferable to distribute the contents of each mixing in a relatively large number of separate tins, for example 20 to 40.

The dosage of the nisin in the cultures and in the cheeses was effected by a method of dilution, with *Str. cremoris* (P5) as test organism.

None of the cheeses (Gruyère) used in the tests contained nisin.

Results

The tables indicate the results obtained in four series of tests:

Table 1.—Effect of an addition of *Str. lactis* culture No. 12 on the swelling of melted cheese after prolonged incubation at 37° C.

"The figures indicate the percentage of tins which have swollen during the period in question."

| Liquid added | Water | Water | IP5 on milk | No. 12 on milk |
|---|---|---|---|---|
| Units of nisin per g. of cheese [1] | 0 | 0 | 0 | 300 |
| Inoculation by clostridia | 0 | C16+3P+4L$gc$ | | |
| 0–25 days | | | 100 | 63 |
| 25–50 days | | 33 | | 37 |
| 50–100 days | | 33 | | | 9 |
| 100–150 days | | | | | 9 |
| 150–200 days | | | | | 9 |
| Total percentage of swollen tins after 200 days | 66 | 100 | 100 | 27 |

[1] Proportion of nisin found in the cheese immediately after melting.

Table 2.—Effect of an addition of nisin in aqueous solution or in the form of Str. No. 12 culture on the swelling of tins of melted cheese.

| Test | A | B | C | D | E |
|---|---|---|---|---|---|
| Liquid added | Water | Water | Aqueous sol. of nisin | No. 12 on milk | No. 12 on milk |
| Units of nisin per g. of cheese | 0 | 0 | 50 | 50 | 100 |
| Inoculation by the clostridia | 0 | C16+3P | | | |
| days at 37° C.: | | | | | |
| 0–5 | | | | | |
| 5–10 | 73 | 43 | | 53 | 2 |
| 10–15 | 27 | 57 | 15 | 25 | |
| 15–20 | | | 31 | 5 | 3 |
| 20–25 | | | 8 | | |
| 25–30 | | | 3 | | |
| 30–40 | | | 3 | | |
| 40–50 | | | 5 | | |
| 50–60 | | | 5 | | |
| Total percentage swollen after 60 days | 100 | 100 | 70 | 83 | 5 |

Table 3.—Effect of nisin on the swelling of tins of melted cheese prepared with a cheese emanating from milk infected with C16.

| Liquid added | Water | Aqueous solution of nisin |
|---|---|---|
| Units of nisin per g | 0 | 50 |
| 0–5 days at 37° C | | |
| 5–10 days at 37° C | 20 | |
| 10–15 days at 37° C | 43 | |
| 15–20 days at 37° C | 30 | |
| 20–25 days at 37° C | 7 | |
| 25–30 days at 37° C | | |
| 30–40 days at 37° C | | 8 |
| 40–50 days at 37° C | | 5 |
| 50–60 days at 37° C | | 2 |
| Total percentage of tins swollen after 60 days | 100 | 15 |

Table 4.—Influence of an addition of milk or lactis acidi on the swelling of tins of melted cheese prepared with a mixture of cheese which has not received an artificial inoculation of clostridia.

| Liquid added | Water | Milk | IP5 on milk | No. 12 on milk |
|---|---|---|---|---|
| Units of nisin per g | 0 | 0 | 0 | 60 |
| 1 day at 37° C | | | | |
| 2 days at 37° C | 0 | 10 | 5 | |
| 3 days at 37° C | 5 | 65 | 60 | |
| 4 days at 37° C | 30 | 20 | 30 | 25 |
| 5 days at 37° C | 60 | 5 | 5 | 15 |
| 6 days at 37° C | | | | 40 |
| 7 days at 37° C | 5 | | | 15 |
| 8 days at 37° C | | | | |
| 9 days at 37° C | | | | 5 |
| Total percentage of tins swollen after 9 days | 100 | 100 | 100 | 100 |

Each series of tests was prepared with a single mixture of cheeses, grated and well homogenised. On the other hand, as stated in the foregoing, the mixtures of cheeses differed from one series to the other and the swelling tendency of these various mixtures was found to be rather variable in the experiment. It undoubtedly depends more upon the composition of the cheeses and the activity of the clostridia present than upon the total number of these germs per gram of cheese. In fact, the results listed in Table 4 were obtained with non-inoculated cheeses which, on an average, swelled more quickly than cheeses to which a heavy dose of a culture of clostridia was added (Tables 1, 2 and 3). In the case of the mixture of cheeses indicated in Table 2, the control tins (addition of water) swelled at the same rate without inoculation (A) and with inoculation of clostridia (B).

*Inhibiting action of nisin on swelling.*—The inhibiting action of nisin is itself, to a certain extent, a function of the varying tendency of the cheeses to swell and probably of the sensitivity of the various strains of clostridia to the antibiotic, but on the whole this action is pronounced in the four series of tests.

The results appearing in the tables relate to melted cheeses have the following characteristics:

|  | Percent |
|---|---|
| Content of dry substance | 44 |
| Fat content | 19 |
| pH | 6.0 |

Such a composition alone places the melted cheese in a zone favourable to the development of clostridia. The tests made with lower pH values or with higher dry contents (not reported here) gave results parallel to those which are now set out, but the average speed of swelling is reduced.

The figures in the Table 1 show that all the tins of melted cheese which received a culture of IP5 on milk swell in less than 50 days, while 9% only of the tins to which inhibiting culture No. 12 was added swell in the same period of time. After 200 days in an oven at 37° C., the proportion of swollen tins reaches 27% in the test which have received the inhibiting culture.

In Table 2, it will be seen that the tins E, to which a culture having a highly inhibiting action (100 units of nisin per gram of cheese) swelled in the proportion of 2% after 15 days at 37° C., while 100% of the "control" tins A and B swelled during the same period. After 60 days at 37° the proportions of swollen tins of lot E does not exceed 5%.

Finally (Table 3), the cheese emanating from a milk infected with clostridia (strain C16) produced in 25 days the complete swelling of all the control tins, while no swelling is observed in the same cheese to which a solution of nisin (50 units per gram of cheese) was added. After 60 days, only 15% of the tins to which nisin was added had swelled.

This specific action of nisin is all the more remarkable since the milk added to the melted cheese seems in most cases to exert a favourable influence on the production of gas by clostridia (Tables 2 and 4).

Table 4 shows that the two lots of tins, one having milk added thereto and the other the culture of *Str. cremoris* IP5, swelled at maximum, substantially equal speed. On the other hand, the "control" tins (cheese with water added) swell less quickly than the previous tins. Finally, the tins which received the culture of *Str. lactis* No. 12 were the last to swell. Similarly, it will be seen from Table 2 that cheese D, to which culture No. 12 on milk was added and which contains 50 units of nisin per gram, swells more quickly than cheese C, which contains the same dose of nisin, but in the form of aqueous solution.

However, from the instant when a sufficient concentration of nisin is reached (cheese E (Table 2): 100 units per gram), the inhibiting action is sufficiently strong to compensate for the favourable effect, resulting from an addition of milk, on the development of clostridia and practically to stop the growth of the latter. It has already been noted that the mixtures of cheese corresponding to the tests of Table 2 swelled at almost the same speed with and without artificial inoculation of clostridia and that the aptitude of the controls A and B was very marked. The result obtained with the tins E therefore appears to be significant. (Table 2).

*Stability of nisin in melted cheese.*—It is found that nisin is stable under heat in an acid medium: in milk cultures whose final pH is 4.6, it resists heating at boiling point over a water bath.

With the melting methods employed for Gruyère cheese, the temperature remains between 80° and 90° C. for about 10 minutes, the pH of the product generally being within the range 5.6–6.2 (on an average 5.8).

It has been verified that despite this (relatively) high pH, the proportion of nisin destroyed in the course of the heating in the mixing remains rather low, of the order of 10% of the initial quantity. The melted cheese therefore contains about 90% of the nisin introduced by the culture, even when the pH is 6.2 and the temperature 90° C.

Subsequent heating (sometimes used in the industry to complete the destruction of the germs) of the melted cheese, carried out after the distribution into tins—25 minutes over a boiling water bath—also exerts no appreciable destructive action on the nisin.

The proportion of nisin in the melted cheese gradually diminishes in the course of the preservation.

It may be observed that it is no longer necessary to avoid feeding the cows on silage which may contain clostridia. The cows may be fed on silage and the milk treated in accordance with the present invention for the production of cheese of the kind referred to.

Instead of adding nisin producing organisms to the cheese or cheese milk, we may produce a concentrate of nisin which is then added. Thus for example instead of adding to processed cheese a whey containing nisin we may obtain a concentrate of nisin from the whey and add this extract to the cheese. The production of such a concentrate is described in "The Lancet" 1947 ii p. 5.

We claim:

1. A process of treating cheese to prevent distention thereof comprising adding to cheese a substance selected from the group consisting of nisin and nisin-producing bacterial cultures, thereby inhibiting the growth of spoilage organisms.

2. A process as claimed in claim 1 wherein the culture together with stabilising salts is mixed with melted cheese which is then cooled.

3. A process as claimed in claim 1 wherein the said substance consists of nisin-producing organisms and is introduced into the cheese in the form of whey containing said organisms.

4. A process of producing cheese which comprises adding to cheese milk a substance selected from the group consisting of nisin and nisin-producing bacterial cultures, and producing cheese from such mixture, thereby inhibiting the growth of spoilage organisms.

5. A process as claimed in claim 4 wherein the said substance consists of nisin-producing organisms and is introduced into the cheese milk in the form of whey containing said organisms.

6. A process as claimed in claim 4 wherein a non-antibiotic producing bacterial starter culture is also added to the cheese milk.

7. A process as claimed in claim 4 wherein the quantity of antibiotic producing culture and the non-antibiotic producing starter are added in quantity together amounting to 0.5 to 2 per cent by volume of the cheese milk.

8. A process as claimed in claim 4 wherein the quantity of nisin added is approximately equal to the quantity of non-antibiotic culture added.

References Cited in the file of this patent

Journal of General Microbiology, volume 4, pages 70, 71, 72, article "The Assay of the Antibiotic Nisin," by A. Hirsch.

Journal of Dairy Science, volume 32, 1949, pages 961 to 967.

Journal of Dairy Science, volume 33, 1950, pages 466 to 472.

Journal of Dairy Research, 1951, 18, 205.